United States Patent [19]

Yamada et al.

[11] Patent Number: 4,816,968
[45] Date of Patent: Mar. 28, 1989

[54] ILLUMINATING DEVICE FOR AUTOMOTIVE FRONT GRILLE

[75] Inventors: Atsushi Yamada; Masaki Hagiwara, both of Shizuoka, Japan

[73] Assignee: Koito Manufacturing Co., Ltd., Tokyo, Japan

[21] Appl. No.: 103,877

[22] Filed: Oct. 2, 1987

[30] Foreign Application Priority Data

Mar. 28, 1987 [JP] Japan .................................. 62-74977
Aug. 31, 1987 [JP] Japan ................................ 62-216772

[51] Int. Cl.$^4$ .............................................. B60Q 1/26
[52] U.S. Cl. ....................................... 362/80; 362/32; 362/268; 362/297; 362/309; 362/310
[58] Field of Search .................. 362/32, 80, 268, 297, 362/307, 309, 310, 335, 340, 79, 61

[56] References Cited

U.S. PATENT DOCUMENTS 4,241,388 12/1980 Green .................................. 362/268
4,389,698 6/1983 Cibie .................................. 362/80 X
4,652,979 3/1987 Arima ..................................... 362/80

Primary Examiner—Stephen F. Husar
Attorney, Agent, or Firm—Sughrue, Mion, Zinn, Macpeak & Seas

[57] ABSTRACT

An illuminating device for a grille portion between the headlamps of an automobile which is illuminated both day and night to blend the grille with the headlamps. The device includes a clear front panel having a display portion and a step pattern having a lens-like cross section formed in the rear surface of the panel. An inner lens is provided behind the front panel having upwardly slanting sawtooth-like step reflecting structures formed on the front surface of the inner lens and a light-converging structure formed on the rear surface. A light directing plate having a reflecting surface is disposed behind the inner lens. A light source is mounted in a central thick portion of the light directing plate.

12 Claims, 4 Drawing Sheets

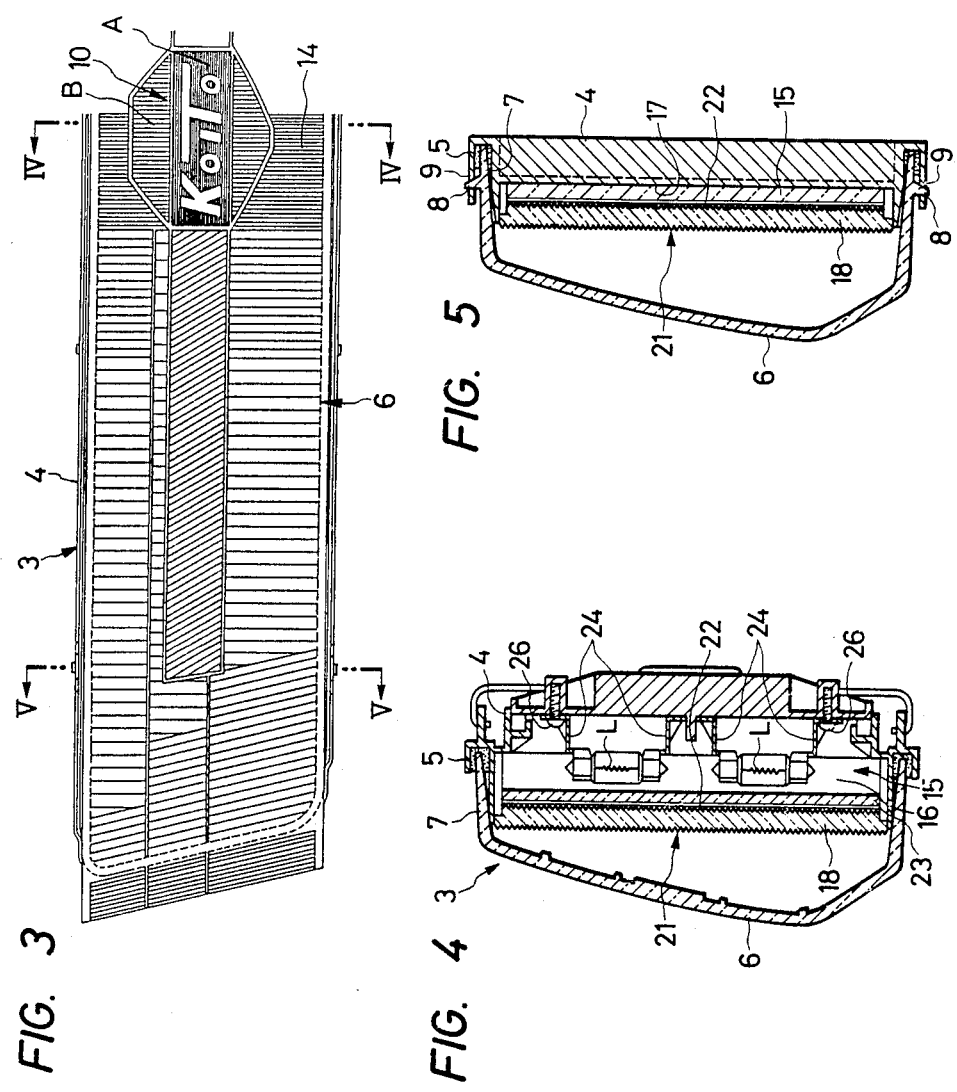

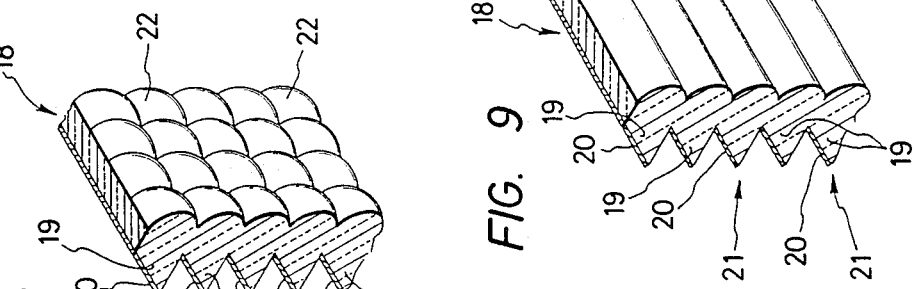
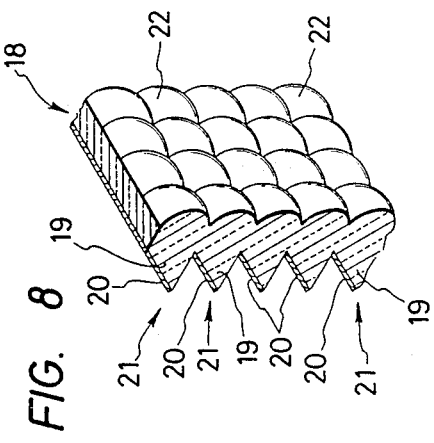
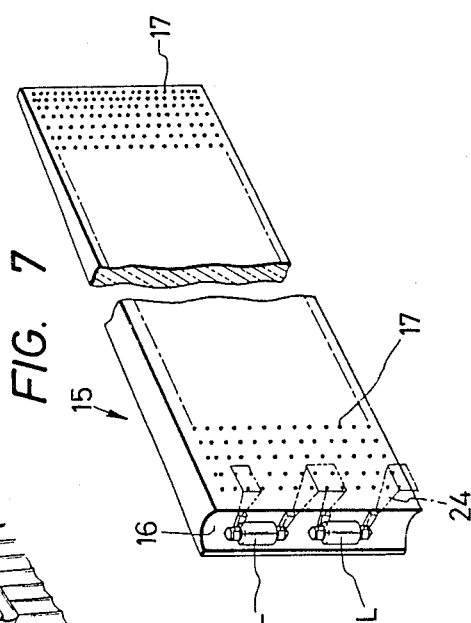
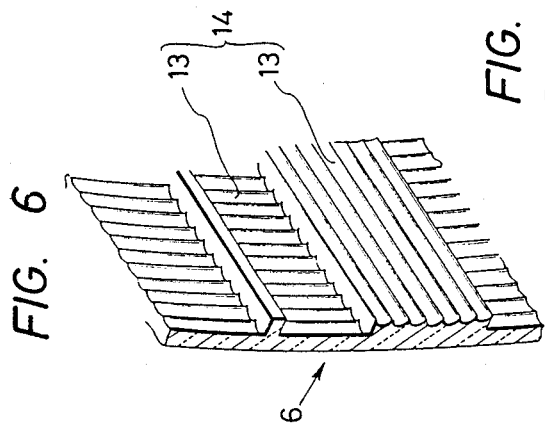

ILLUMINATING DEVICE FOR AUTOMOTIVE FRONT GRILLE

BACKGROUND OF THE INVENTION

The present invention relates to an illuminating device for brightening a front grille portion between headlamps so as to obtain a metallic appearance blending with the headlamps when the headlamps are in their nonlit state.

Techniques have been known for brightening a front grille portion between headlamps so as to make the grille portion blend with the headlamps. For example, as shown in FIG. 1, the front of a body 50 located between the headlamps is provided with a mirror surface 51, and the front of the body 50 is covered with a transparent synthetic resin lens 52 having steps formed at intervals. External light such as sunlight transmitted through the transparent lens 52 is reflected by the mirror surface 51 so that the transparent lens 52 is brightened to have a metallic appearance by a back lighting action of the reflected light.

In such an arrangement, there is, however, a problem in although sunlight will be reflected by the mirror surface 51 in such a manner that the body portion is brightened in the daytime, in the nighttime no such a brightening action can be effected and the shape of the grille portion between the headlamps cannot be seen, thus presenting a less pleasing appearance.

A light source for nighttime lighting can provided within a hollow portion 53 defined by the body 50 and the transparent lens 52 covering the front of the body 50. In such a case, however, it is difficult to obtain even illumination over the entire length of the front grille. If a plurality of light sources are incorporated to thereby obtain more even illumination, the above-mentioned hollow portion 53 forming a lamp chamber must be increased in size, resulting in an increased cost.

SUMMARY OF THE INVENTION

The present invention has been attained in view of the foregoing problems, and an object thereof is to provide an illuminating device in which a front grille portion in the vicinity of the two headlamps of a vehicle can be brightened even in the nighttime so that the width of the vehicle can be more easily ascertained, and in which an even brightness can be obtained with a shallow lamp chamber formed by a thin body.

To solve the above problems, according to the present invention, a illuminating device is provided which comprises: a front panel formed by molding a light transmissible material such as acrylic resin, the front panel having a display portion and a step pattern having a lens-like cross section formed in the rear surface of the front panel; an inner lens provided behind the front panel with a suitable interval therebetween, the inner lens having upwardly slanting sawtooth step reflection structures formed on its front surface and light-scattering structures formed on its rear surface; a light directing plate formed by molding a light transmissible material such as acrylic resin and provided on the rear surface of the inner lens, the light directing plate having a reflection surface formed on the rear surface of the plate; and a light emitting portion extending in the thickness direction of the plate and including suitable light sources such as bulbs.

According to the inventive illuminating device, light coming from the front is reflected by the step reflection structures of the inner lens provided behind the front panel so that, in the case where external light such as sunlight is present, light which has entered through the front panel is reflected by a metal coating of aluminum or the like, which may be formed on the step structure through evaporation, to thereby brighten the front panel from the inside thereof. During such times, the reflected light is light which is reflected by metal surfaces, thus providing a metallic appearance. Therefore, the front panel presents a bright color blending with the headlamps in their nonlit state.

In the case where there is no external light such as in the nighttime, the light sources are turned on. The flux of light generated by the light sources in the light emitting portions advances straightwardly in the thickness direction of the light directing plate and at the same time propagates to the end portions of the light directing plate due to repetition of internal reflection. Diffused reflection to the front surface side of the light directing plate is generated by the reflection surface formed on the rear surface of the light reflecting plate. The light falling on the front surface side to the light directing plate due to the diffused reflection passes through the noncoated portions of the step reflection structures of the inner lens located in front of the light directing plate and is reflected by the reflection surfaces of the step reflection structures adjacent to the noncoated portions, whereby the front panel is illuminated by the thus-reflected light and brightened. The light from the light sources passing through the light directing plate is reflected by the metal coatings of the inner lens, the reflected light results in a metallic appearance, and the front panel presents a bright color blending with the headlamps in the nonlit state.

BRIEF DESCRIPTION OF THE DRAWINGS

FIG. 3 is a front view of the same;

FIG. 4 is an enlarged cross-section taken along a line III—III in FIG. 3;

FIG. 5 is an enlarged cross-sectional view taken along a line IV—IV in FIG. 3;

FIG. 6 is an enlarged perspective view showing a main part of the structure at a part A on the front panel of FIG. 3;

FIG. 7 is an enlarged perspective view showing the structure of a light directing plate;

FIG. 8 is an enlarged perspective view showing a main part of the structure of prisms formed on the rear surface of an inner lens;

FIG. 9 is an enlarged perspective view showing a main part of the structure of other prisms;

DESCRIPTION OF THE PREFERRED EMBODIMENTS

Figure 1:
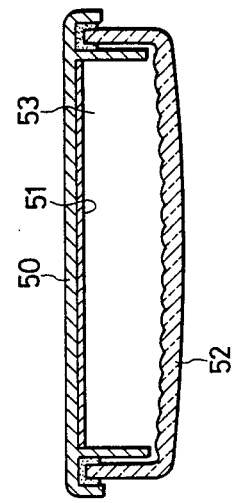
FIG. 1 is a plan sectional view showing a main part of a conventional grille.
Figure 2:
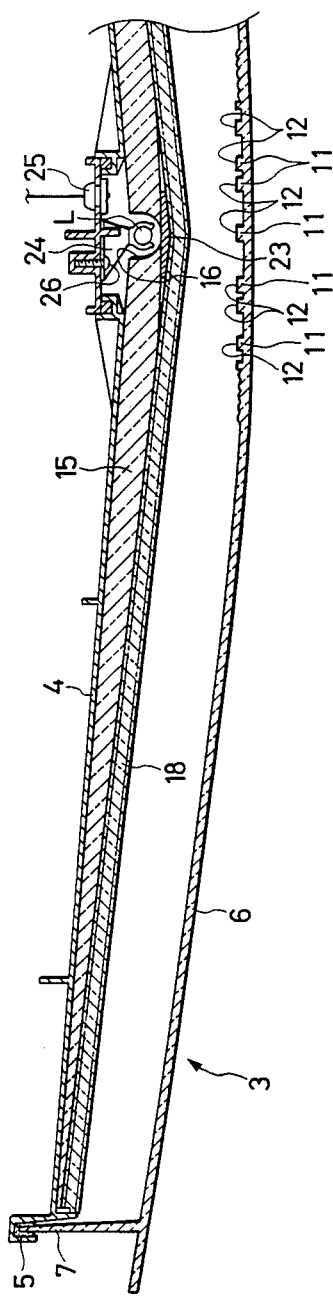
FIG. 2 is a plan view in section of a front grille portion in a preferred embodiment of an illuminating device constructed according to the present invention.
Figure 10:
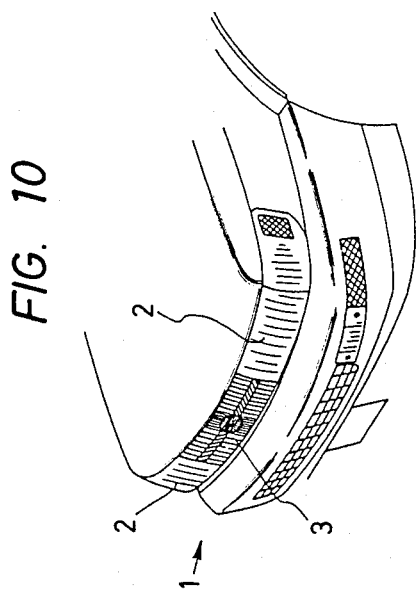
FIG. 10 is a perspective view of a front grille portion of a car showing the attachment of the illuminating device.

Referring FIGS. 2-12 of the drawings, preferred embodiments of an illuminating device according to the present invention will be described in detail.

Reference numeral 1 designates a front grille portion of a car provided with an illuminating device 3 according to the present invention. The illuminating device 3 is provided between headlamps 2 arranged at opposite ends of the front grille portion 1.

Reference numeral 4 designates a frame for supporting the illuminating device 3. The supporting frame 4 is made of non-light-transmissible member so as to block light from the headlamps 2 and from the rear side. A fitting edge 7 formed at the circumference of a front panel 6 formed by molding transparent synthetic resin such as acrylic resin is fitted into a fitting groove 5 circumferentially formed in the outer circumference of the front of the supporting frame 4. Protrusions 8 formed on the end portions of the fitting edge 7 are engaged with locking holes 9 formed in the supporting frame 4 so as to integrally lock the two together. In order to form a display portion 10 for a car name or the like on the front surface of the front panel 6, respective surfaces of projecting portions 11 formed at a center portion on the rear surface of the front panel 6 corresponding to the display portion 10 are coated with printed layers 12 formed by screen printing or the like.

Further, a step pattern 14 is constituted by flutes 13 and 13 composed of longitudinal and transverse grooves, as shown in FIG. 6, similar to the lenses of the headlamps 2. The step pattern 14 is arranged such that, particularly at portions which receive illumination of high intensity in the vicinity of light sources L such as portions A and B indicated in FIG. 3, the flutes 13 are formed at a high concentration, that is, at a small pitch, so as to increase the degree of scattering of light. As a result, an even illuminating effect is obtained and dazzling is prevented at the front surface side.

A light directing plate 15, formed by molding transparent synthetic resin such as acrylic resin, is fixedly provided on the front to the above-mentioned supporting frame 4 and at the rear side of the front panel 6. As shown in FIG. 7, the thickness of the light directing plate 15 is increased at a longitudinal central portion of the plate 15 where a light-source accommodating recess 16 is formed in the plate, while the thickness of the plate 15 is gradually reduced away from the central portion. Further, numbers of circular cone concave dots 17 are formed in the rear surface of the light directing plate 15 so as to provide a reflecting surface which reflects light toward the front side. The pattern of the concave dots 17 varies successively from rough to fine moving away from the vicinity of the light source accommodating recess 16 of the light directing plate 15 so as to equalize the quantity of light reflected by the concave dots 17.

Within the light source accommodating recess 16, the light sources L are arranged so that respective light emitting portions of the light sources L face the whole of the reflecting surface composed of the concave dots 17 formed in the rear surfaces of the light directing plate 15. The light sources L used in this embodiment may be so-called linear light sources such as xenon lamps constituted with linear filaments. Two such linear light source L aligned in the widthwise direction of the light directing plate 15 of relatively great width may suffice for the light directing plate 15 so that illuminating losses can be made small.

Reference numeral 18 designates an inner lens additionally provided in front of the above-mentioned light directing plate 15 at a position in opposition to the front panel 6 and with a certain interval therebetween. The inner lens 18 is formed by molding transparent synthetic resin such as acrylic resin in such a manner that, as shown in FIG. 8, a plurality of sawtooth step structures 19, each slanting upward by about 45 degrees, are formed on the front surface of the inner lens 18. Reflecting metal coatings 20 are provided on the slanting source portion of the respective sawtooth step structures 19 by depositing a reflecting metallic material such as aluminum or the like through evaporation or a spattering process, thereby constituting a step reflecting structure 21.

Fisheye prisms 22 are provided over the entire rear surface of the inner lens 18 corresponding to the step reflecting structure 21. As will be described below, the fisheye prisms 22 function to converge light emitted by the light sources L and to suppress generation of uneven brightness in the step reflection structures when light is emitted from the inner lens 18.

A filter 23 made of a milk-white semitransparent material and having a section similar to that of a convex lens is interposed between the inner lens 18 and the light directing plate 15 so as to cover the light sources L. The filter 23 acts to attenuate light radiation in the vicinity of the light source L so as to make the overall illumination uniform.

Further in these drawings, reference numeral 24 designates terminal plates for supporting the bulbs of the light sources L, the terminal plates 24 also being used as supports for the light sources L. Reference numeral 25 designates a bushing for insertion of a cord (not shown) for supplying power to the light sources L, and 26 designates screws for fixing the terminal plates 24.

FIG. 9 shows another embodiment, in which a light flux control structure is formed on the rear surface of the inner lens 18. In this embodiment, the abovementioned fisheye prisms 22 are replaced by semicircular prisms 27 constituted in correspondence to the step reflecting structures 21. According to this embodiment, similar to the embodiment illustrated in FIG. 8, light radiated by the light sources L is converted by the prisms 27 while uneven brightness in the step reflecting structures 21 is suppressed by continuous light emission in the transverse direction.

In the thus-arranged inventive illuminating device, the light sources L are turned off when external light such as sunlight s present. The light sources L are turned on at times when there is no external light S, such as at night or when passing through a tunnel.

Figure 11:
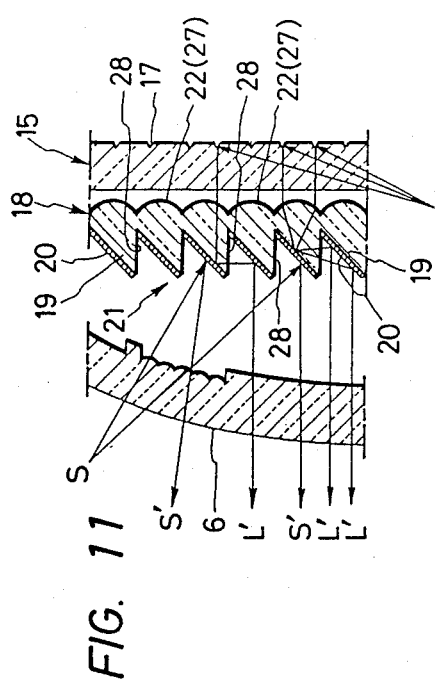
FIG. 11 is a diagram used for explaining a reflecting-projecting action of an inner lens.

When external light S such as sunlight is present, a flux of light enters the front panel 6 in an obliquely downward direction, as shown in FIG. 11, and the flux of light transmitted through the front panel 6 is reflected frontward (as the reflected luminous flux S") by the metal reflecting coatings 20 on the step reflecting structures 21 formed on the slanting surface portions of the sawtooth step structures 19 on the inner lens 18 provided behind the front panel 6. Hence, the front panel 6 is brightened by illumination from the rear side. At this time, the reflected light S' is formed by light reflected by the metal reflecting coatings 20, thus producing a metallic appearance. Hence, the front panel 6 presents a brightened appearance similar to the headlamps 2 in their off state.

In the case where no external light S is present, the light sources L are turned on so that source light L generated by the bulbs of the light sources L enters the light directing plate 15 from the light source accommodating recess 16. Diffused reflection to the front surface side is caused by the reflecting surfaces constituted by the concave dots 17 formed on the light directing plate 15. The flux of light L directed to the front surface side by the diffused reflection is then converged by the prisms 22 or 27 formed on the rear surface of the inner lens 118. After being converged, the flux of light reaches the front surface side of the inner lens 18. The light flux is then is reflected between the pairs of the metal reflecting coatings 20 adjacently formed in the sawtooth step structures 19, and at the same time the light flux L' passed through the non-coated portions 28 of the metal reflecting coatings 20 illuminates the front panel 6 from the rear surface side thereof. At this time, since the flux of light L' is reflected by the metal reflecting coatings 20 of the inner lens 18, a metallic appearance is obtained so that the front panel 6 presents a bright color similar to the headlamps 2 in their nonlit state.

Figure 12:
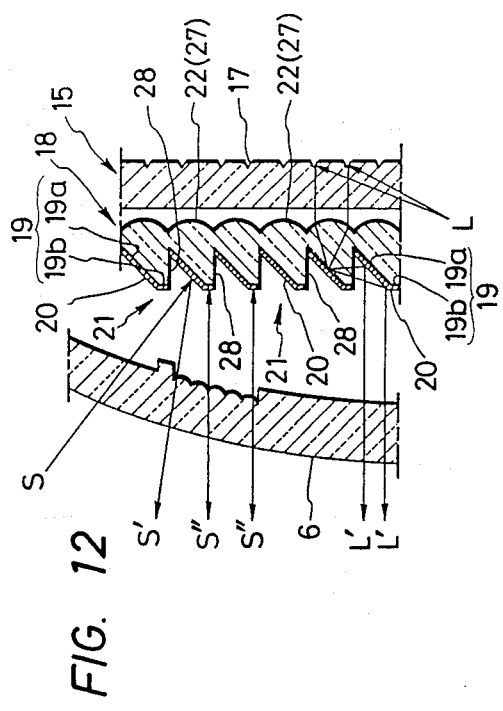
FIG. 12 is a diagram showing a reflecting-projecting action in another embodiment of the inner lens.

FIG. 12 shows another embodiment in which the front surface side shape of the step reflecting structures 21 constituted by the sawtooth step structures 19 is modified so that the forward end portion of each of the sawtooth steps 19 is vertically cut off. Accordingly, the step reflecting structures 21 are formed by applying a metallic reflecting coating 20 on a slanting surface portion 19a and a vertical surface portion 19b of each of the sawtooth step structures 19. Hence, when external light S such as sunlight is present, the light is reflected (as reflected light flux light S") by the metallic reflecting coatings 20 applied to the slanting surface portions 19a, and at the same time the light is reflected (as reflected light flux S") by the metallic reflecting coatings 20 applied to the vertical surface portions 19b. Accordingly, an even metallic brightening action is presented over the entire surface including the front (viewing) side.

What is claimed is:

1. An illuminating device provided in the vicinity of automotive headlamps, comprising: a front panel formed by molding a light transmissible material, said front panel having a display portion and a step pattern having a lens-like cross section formed in the rear surface of said front panel; an inner lens provided behind said front panel with a predetermined interval therebetween, said inner lens having upwardly slanting sawtooth-like step reflecting structures formed on the front surface of said inner lens and having light-converging structures formed on the rear surface of said inner lens; a light directing plate formed by molding a light transmissible material and provided behind the rear surface of said inner lens, said light directing plate having a reflecting surface formed on the rear surface thereof; and light source means provided in a recess in said light directing plate.

2. The illuminating device of claim 1, wherein a thickness of said light directing plate increases towards a center portion thereof.

3. The illuminating device of claim 2, wherein said light source means is disposed inside a recess formed in said center portion of said light directing plate.

4. The illuminating device of claim 1, wherein said light directing plate has a plurality of circular concave dots formed therein.

5. The illuminating device of claim 4, wherein a density of said concave dots varies from rough to fine away from said recess.

6. The illuminating device of claim 1, wherein said light source means comprises a linear light source.

7. The illuminating device of claim 1, wherein said sawtooth structures slant upward by an angle of approximately 45 degrees.

8. The illuminating device of claim 7, wherein reflecting metal coatings are formed on slanting surface portions of said sawtooth structures.

9. The illuminating device of claim 1, wherein said light-converging structures on said rear surface of said inner lens comprise fisheye prisms.

10. The illuminating device of claim 2, wherein said light structures on said rear surface of said inner lens comprise semicircular prisms.

11. The illuminating device of claim 1, further comprising a milk-white semitransparent filter interposed between said inner lens and said light directing plate converting said light source means.

12. The illuminating device of claim 1, wherein said light source means directs light toward said reflecting means through said light transmissible material of said light directing plate.

* * * * *